(12) United States Patent
McLaughlin

(10) Patent No.: US 7,708,494 B2
(45) Date of Patent: May 4, 2010

(54) WATER DIVERSION SYSTEM AND METHOD HAVING HYDRAULIC CHUTE, SCREEN ASSEMBLY AND WEDGE WIRE SCREEN

(75) Inventor: Richard Evan McLaughlin, Lakewood, CO (US)

(73) Assignee: McLaughlin Consulting Company, Denve, CO (US)

( * ) Notice: Subject to any disclaimer, the term of this patent is extended or adjusted under 35 U.S.C. 154(b) by 263 days.

(21) Appl. No.: 11/925,174

(22) Filed: Oct. 26, 2007

(65) Prior Publication Data

US 2008/0101867 A1  May 1, 2008

Related U.S. Application Data

(60) Provisional application No. 60/854,606, filed on Oct. 26, 2006.

(51) Int. Cl.
  *E02B 8/08* (2006.01)
(52) U.S. Cl. .......................... 405/81; 405/80
(58) Field of Classification Search .................. 405/75, 405/76, 77, 78, 79, 80, 81
See application file for complete search history.

(56) References Cited

U.S. PATENT DOCUMENTS

| | | | | |
|---|---|---|---|---|
| 1,825,169 | A * | 9/1931 | Wyckoff | 405/81 |
| 2,826,897 | A * | 3/1958 | Vinsonhaler et al. | 405/81 |
| 3,868,324 | A * | 2/1975 | Taylor et al. | 405/83 |
| 4,260,286 | A * | 4/1981 | Buchanan | 405/81 |
| 4,352,593 | A * | 10/1982 | Iskra et al. | 405/80 |
| 4,415,462 | A | 11/1983 | Finch et al. | |
| 4,481,904 | A * | 11/1984 | Fletcher | 405/81 |
| 4,526,494 | A * | 7/1985 | Eicher | 405/81 |
| 4,740,105 | A * | 4/1988 | Wollander | 405/81 |
| 5,385,428 | A * | 1/1995 | Taft et al. | 405/81 |
| 6,524,028 | B2 | 2/2003 | Bryan | |
| 6,705,049 | B2 | 3/2004 | Esmond et al. | |
| 2002/0127060 | A1* | 9/2002 | Bryan | 405/81 |
| 2002/0175120 | A1 | 11/2002 | Norell et al. | |
| 2003/0198516 | A1* | 10/2003 | Bryan | 405/81 |
| 2003/0219311 | A1* | 11/2003 | Hildstad et al. | 405/81 |

OTHER PUBLICATIONS

Tony L. Wahl and Robert F. Einhellig, "Laboratory Testing and Numerical Modeling of Coanda-Effect Screens", 2000 Joint Conference on Water Resources Engineering and Water Resources Planning & Management Jul. 30 - Aug. 2, 2000, Minneapolis, Minnesota, pp. 1-10.

Tony L. Wahl, "Hydraulic Performance of Coanda-Effect Screens", Journal of Hydraulic Engineering, Jun. 2001, pp. 480-488.

Tony L. Wahl, "Hydraulic Testing of Static Self-Cleaning Inclined Screens", First International Conference on Water Resources Engineering, Aug. 14-18, 1995, pp. 1-6.

* cited by examiner

*Primary Examiner*—Frederick L Lagman
(74) *Attorney, Agent, or Firm*—Stephen A. Gratton

(57) ABSTRACT

A water diversion system includes a hydraulic chute and a chute screen assembly in the hydraulic chute having a wedge wire screen. The water diversion system also includes at least one collection chamber located below the screen configured to collect filtered diversion water which has passed through the screen. The hydraulic chute includes a base, a crest, a sloped accelerator, and an abrupt drop with an adjustable lip, which forms a hydraulic formation in a downstream pool. The hydraulic chute can also include sloped sidewalls, which constrict the flow of water and form fish passage zones. In addition, the chute screen assembly can include a modular panel configured to facilitate construction, maintenance and replacement of the wedge wire screen.

25 Claims, 9 Drawing Sheets

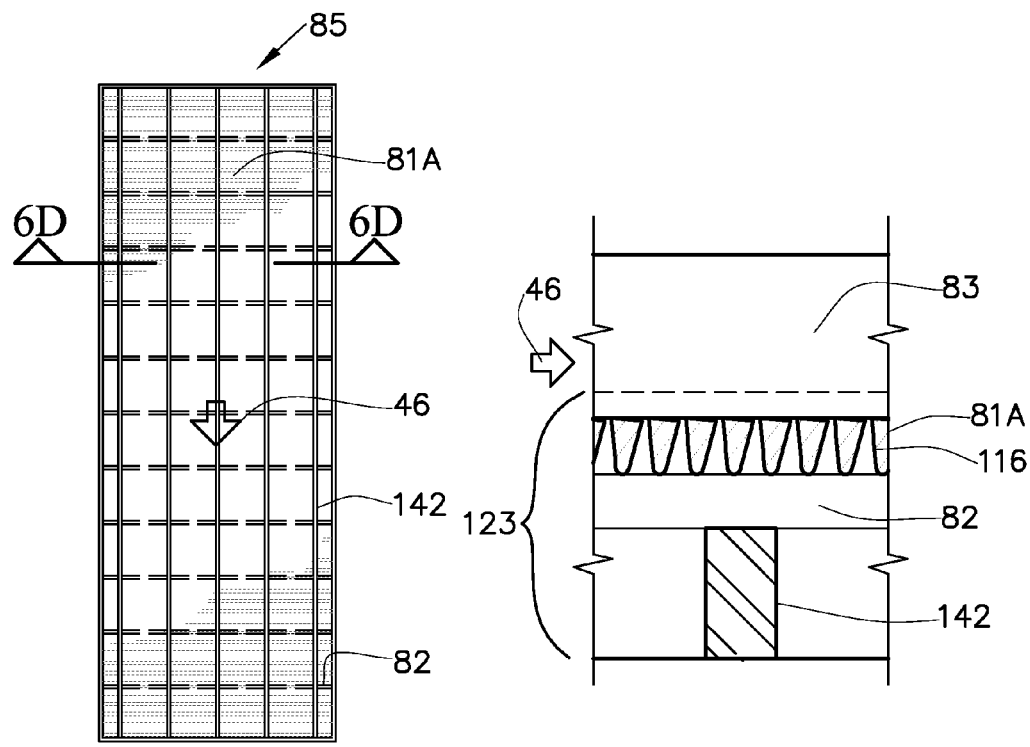
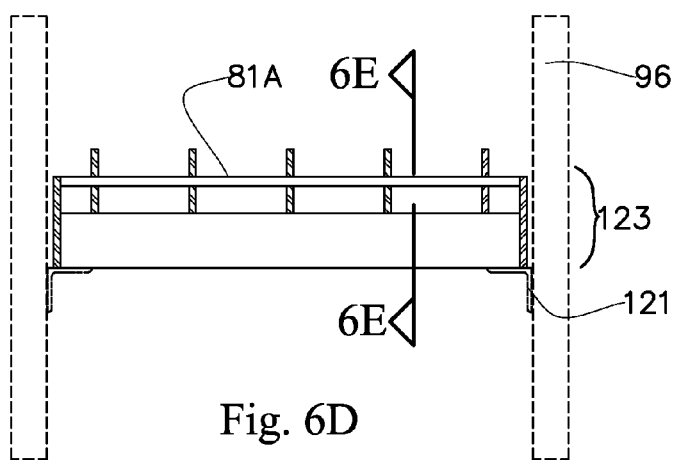
Fig.6C
Fig. 6E
Fig. 6D

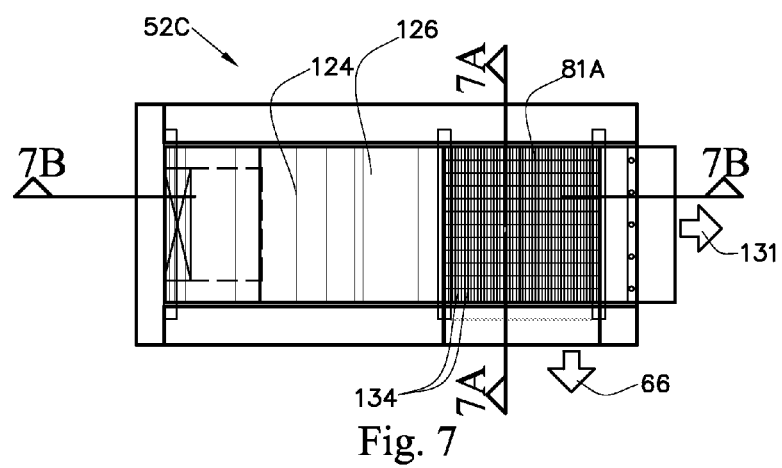
Fig. 7
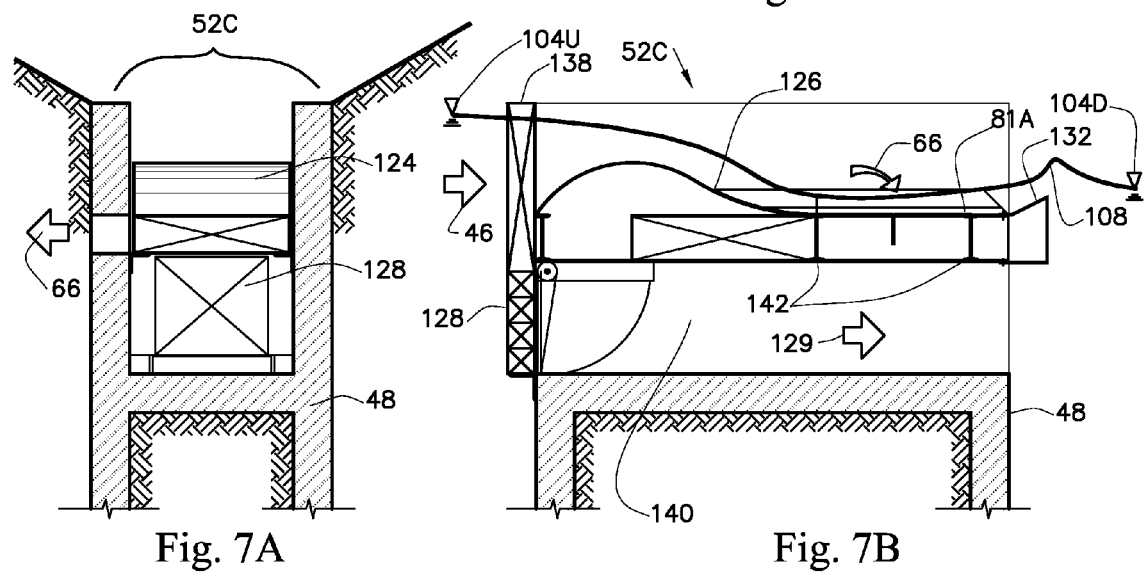
Fig. 7A
Fig. 7B

WATER DIVERSION SYSTEM AND METHOD HAVING HYDRAULIC CHUTE, SCREEN ASSEMBLY AND WEDGE WIRE SCREEN

CROSS REFERENCE TO RELATED APPLICATION

This application claims priority from U.S. provisional application Ser. No. 60/854,606 filed Oct. 26, 2006.

BACKGROUND

Water diversions are utilized to divert water from rivers and streams to generate hydropower. Water diversions are also utilized to divert water for agricultural, industrial and municipal water uses. One component of a typical water diversion is a low-head dam or weir. The dam creates a pool where water can be reliably withdrawn through an intake. While these dams can be effective for their intended purposes, they are well known for creating hazards for fish and recreational river users, such as "boaters" and "river runners".

FIG. 1 illustrates a conventional screened water diversion system 10 for diverting water on a river 12. The screened water diversion system 10 includes a low head dam 14 which forms a relatively large upstream pool 16 and a downstream pool 18 in the river 12. The screened water diversion system 10 also includes a hydraulic gate 20 which channels water to a turbine (not shown) or other water-using system, and a trash rack 26 which prevents debris from entering the diverted flow.

One potential hazard for recreational rivers users produced by the low head dam 14 is illustrated in FIG. 2. In particular, the water flow 22 over the low head dam 14 forms a reversed water flow 24 in the downstream pool 12, which can trap recreational rivers users and their watercraft. The hydraulic gate 20, the trash rack 26 and various appurtenances of the screened water diversion system 10 also produce potential hazards for recreational rivers users. These prior art structures also create conditions which: 1.) negatively impact fish habitat and passage; 2.) are expensive to build and maintain; 3.) raise the upstream water surface elevation (due to the low head dam 14), which can adversely affect the floodplain and worsen flooding; 4.) impact the ability of the river to transport sediments; and 5.) require removal of sediments from the upstream pool.

Referring to FIG. 3, another hazardous screened water diversion system is illustrated. In particular, the screened water diversion system can also include a screen assembly 28 associated with the hydraulic gate 20. The screen assembly 28 removes filtered diverted water flow 30 from debris laden flow in the river or channel. A bypass water flow 32 carries the debris, and fish as well, back into the water flow 22 on the river 12. As shown in FIG. 3A, the screen assembly 28 includes a tilted wedge wire screen 29 having backing bars 40, and wedge wire elements 34 attached to the backing bars 40. The tilted wedge wire screen 29 is also known in the art as a COANDA screen. U.S. Pat. No. 4,415,462 to Finch et al.

As shown in FIG. 3, the screen assembly 29 is oriented such that the tilted wedge wire screen 29 (FIG. 3A) has a steep back slope in the flow of water 22. As shown in FIG. 3A, the wedge wire elements 34 are spaced to form openings 36 for water flow 38 through the tilted wedge wire screen 29, which travels along the profile of the wedge wire elements 34. As also shown in FIG. 3A, the wedge wire elements 34 are oriented at an angle "a" relative to the water flow 22, which produces a shearing action which forces a diverted flow 30 (FIG. 3) through the tilted wedge wire screen 29. The tilted wedge wire screen 28 (FIG. 3) relies on a high "sweeping" velocity of the flow of water 22 across the tilted wedge wire screen 28 to keep the openings 36 (FIG. 3A) free of debris.

In addition to being hazardous to recreational river users and to fish, the tilted wedge wire screen 29 (FIG. 3A) requires a large amount of drop "hd" (FIG. 3) and creates the negative conditions outlined above. The large amount of drop "hd" also inhibits upstream fish passage and requires additional fish passage structures if upstream fish passage is required. Furthermore the tilted wedge wire screen 29 (FIG. 3A) is prone to drying up, which has a further negative impact on fish. The tilted wedge wire screen 29 (FIG. 3A) is negatively affected by high tailwater, which slows down the sweeping velocity of the water flow 22, allowing debris to accumulate in the openings 36 (FIG. 3A). A high tailwater in the downstream pool 18 (FIG. 3) can also cause a hydraulic jump to occur on the tilted wedge wire screen 29 (FIG. 3A) further plugging the tilted wedge wire screen 29 and decreasing diversion capacity. Still further, the tilted wedge wire screen 29 is usually placed close to or exposed to cold air such that frazzle ice can form and plug the openings 36 (FIG. 3A).

A variety of other water diversion systems have been constructed which include flat screens of various types with slow-velocity bypass water flow over the screens (sweeping velocities) so that the screens tend to plug or cannot be utilized if debris is present. Other water diversion systems screens are located so that they are not heavily influenced by debris or the water surface elevation in the downstream pool. These could include water diversion systems that have screens elevated far enough above the invert of a river or channel or in a river or channel which has a narrower range of water flows, or in a case where the minimum rate or water flow in the river or channel is much greater than the maximum rate of divert water flow.

In view of the shortcomings of conventional prior art water diversion systems, there is a need in the art for improved systems with components which are less hazardous to recreational river users and fish, which reduce impacts to the floodplain and the natural river morphology, and which pass sediment and debris. In addition, there is a need in the art for water diversion systems that are inexpensive to build and maintain, and which function efficiently over a wide range of environmental conditions.

However, the foregoing examples of the related art and limitations related therewith, are intended to be illustrative and not exclusive. Other limitations of the related art will become apparent to those of skill in the art upon a reading of the specification and a study of the drawings.

SUMMARY

A water diversion system includes a hydraulic chute, and a chute screen assembly having at least one wedge wire screen located in the hydraulic chute. The hydraulic chute is configured to constrict and increase the velocity of the flow of water and force a hydraulic formation (e.g., hydraulic jump, or wave) to occur in a downstream pool. The wedge wire screen is configured to diverge and filter water from the hydraulic chute. The water diversion system also includes at least one collection chamber located below the wedge wire screen. The collection chamber collects filtered diversion water which has passed through the wedge wire screen. The diversion water is channeled through diversion flow outlets in flow communication with the collection chamber to a diversion location (e.g., turbine, water treatment facility, agricultural facility, mining facility). The water diversion system can also include an adjacent river constriction and/or a downstream control section for further focusing the flow and controlling the hydraulic formation produced by the hydraulic chute.

The hydraulic chute includes a base formed of a suitable building material placed on the invert (bottom) of a river or channel. The hydraulic chute includes a crest which constricts and/or elevates (dams) the flow water to increase its energy and focus the flow of water. The hydraulic chute also includes a sloped accelerator or ramp, which accelerates the flow of water. The hydraulic chute also includes an abrupt drop with an adjustable lip, which forms the hydraulic formation in the downstream pool. The hydraulic chute can also include sloped or vertical sidewalls, which constrict the flow of water and forms fish passage zones.

During operation of the water diversion system, the hydraulic chute forms an upstream pool and the downstream pool. The flow of water downstream through the hydraulic chute and over the adjustable lip, also forms the hydraulic formation in the downstream pool. Some of the water flowing through the hydraulic chute is diverted through the wedge wire screen and into the collection chamber. The diverted water is then channeled through the diversion flow outlets to the diversion location. During operation of the water diversion system, fish can pass downstream above the screen or in either direction along the fish passage zones, and are not trapped in the diversion flow, and later returned to the river, as in conventional water diversion systems. In addition, the hydraulic chute allows the flow of water to be controlled without the necessity of a dam, as in conventional water diversion systems. Further, the location of the wedge wire screen in the hydraulic chute provides a sweeping flow which keeps the wedge wire screen clean and free of debris.

A method for diverting a flow of water in a river or a channel includes the steps of: providing a hydraulic chute in the flow of water configured to increase a velocity of the flow of water and to form a downstream hydraulic formation; providing a wedge wire screen in the hydraulic chute configured to divert and filter a diverted water flow from the hydraulic chute; and providing a collection chamber configured to collect the diverted water flow. The method also includes the steps of sweeping the flow of water in the hydraulic chute across the wedge wire screen and downstream to form the hydraulic formation; and directing the diverted water flow through the wedge wire screen into the collection chamber. The method can also include the step of providing fish passage zones in the hydraulic chute on either side of the chute screen assembly. The method can also include the step of providing an adjustable lip and an abrupt drop on the hydraulic chute configured to form the hydraulic formation.

BRIEF DESCRIPTION OF THE DRAWINGS

Exemplary embodiments are illustrated in the referenced figures of the drawings. It is intended that the embodiments and the figures disclosed herein are to be considered illustrative rather than limiting.

FIG. 6C is a plan view of a modular panel of the chute screen assembly;

FIG. 6D is a cross sectional view of the modular panel taken along section line 6D-6D of FIG. 6C;

FIG. 6E is a cross sectional view of the modular panel taken along section line 6E-6E of FIG. 6D.

FIG. 7 is a plan view of an alternate embodiment chute screen assembly having an integrated sluice channel and flow depth increaser;

FIG. 7A is a cross sectional view taken along section line 7A-7A of FIG. 7; and

FIG. 7B is a cross sectional view taken along section line 7B-7B of FIG. 7.

DETAILED DESCRIPTION

Figure 1:
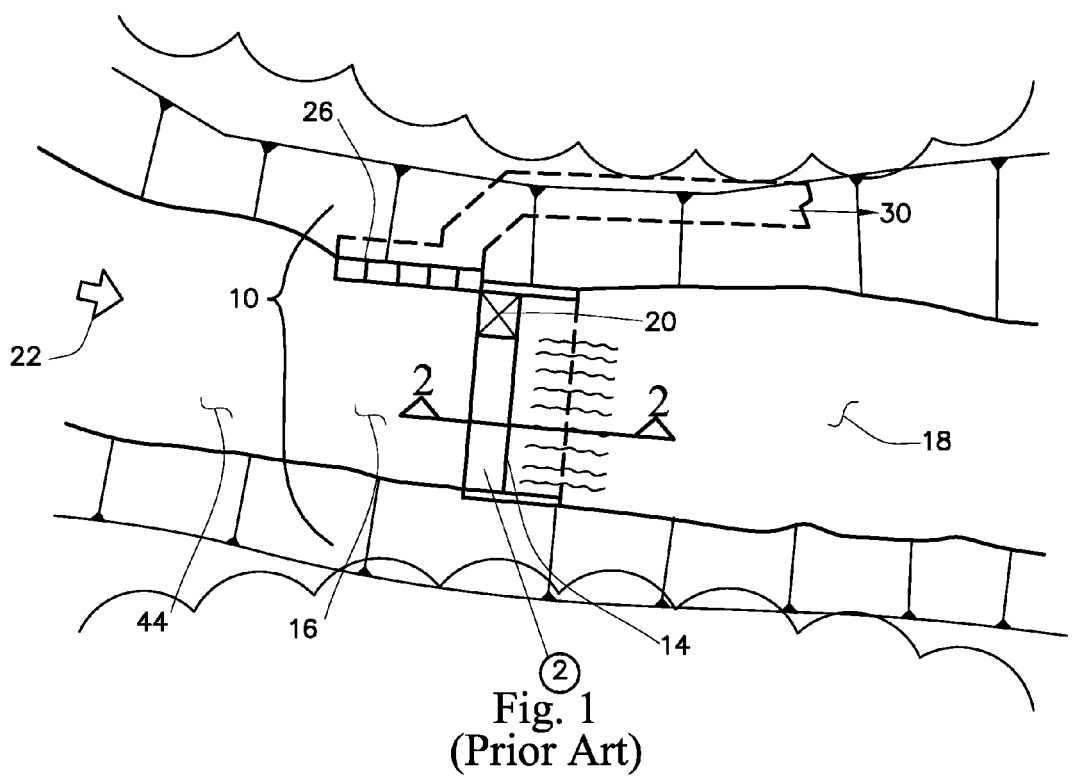
FIG. 1 is a schematic plan view of a prior art water diversion system.
Figure 2:
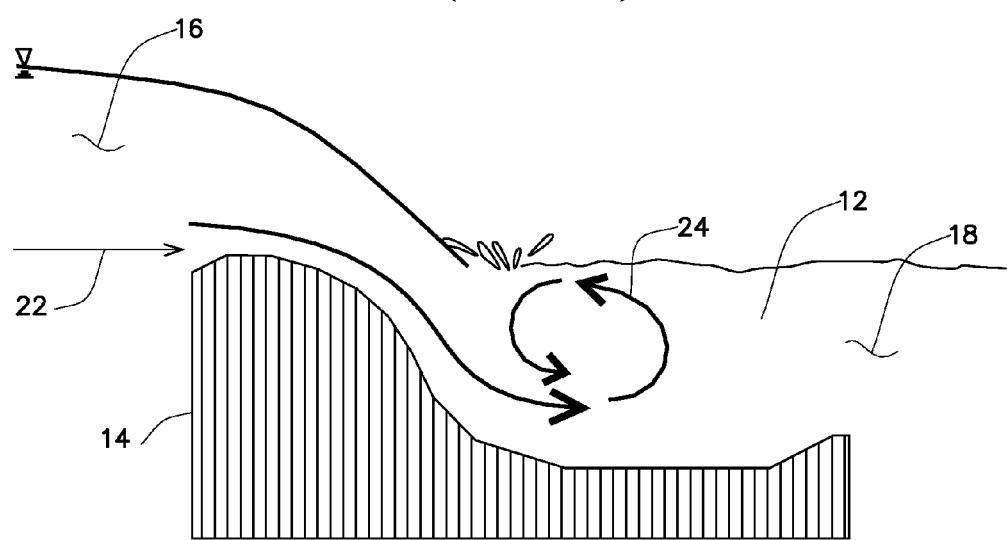
FIG. 2 is a schematic cross sectional view illustrating hydraulic conditions in the prior art water diversion system.
Figure 3:
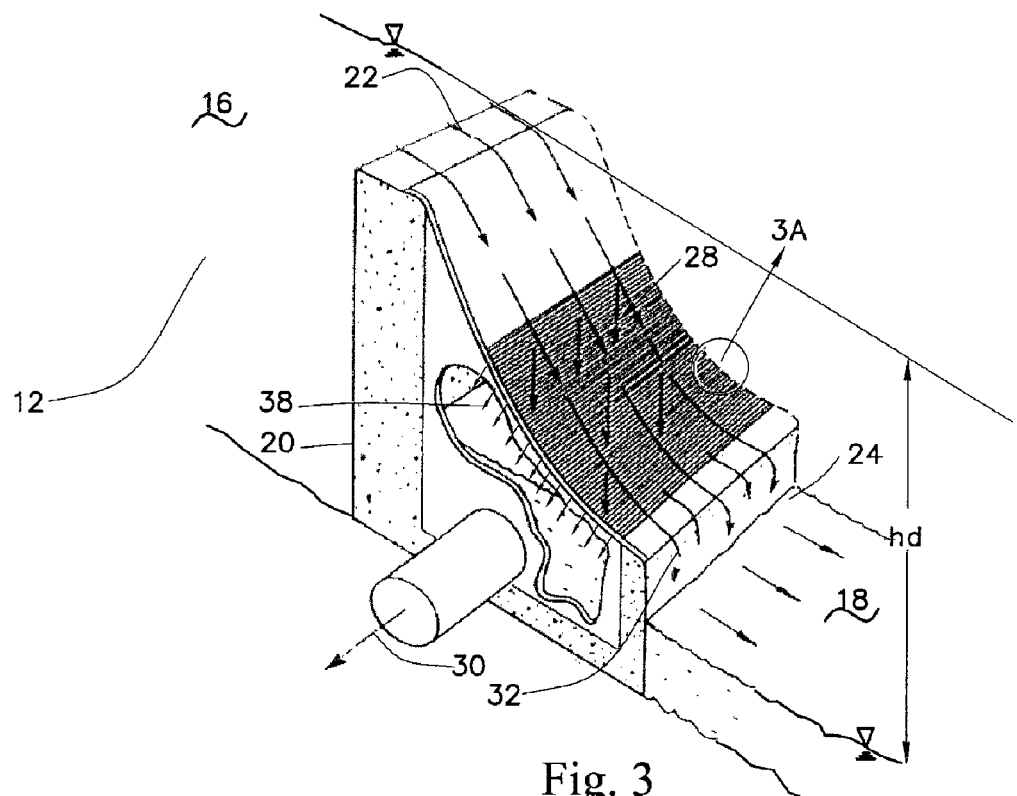
FIG. 3 is a schematic cross sectional view illustrating a hydraulic gate in the prior art water diversion system having a wedge wire screen.
Figure 3A:
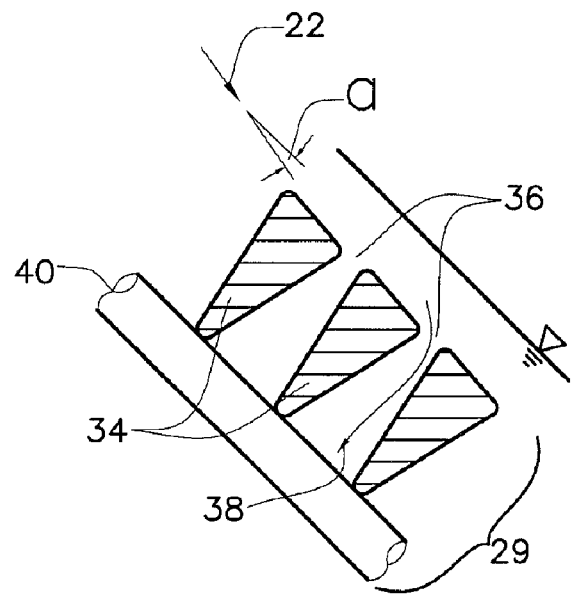
FIG. 3A is an enlarged portion taken along line 3A of FIG. 3 illustrating the construction of the wedge wire screen.
Figure 4:
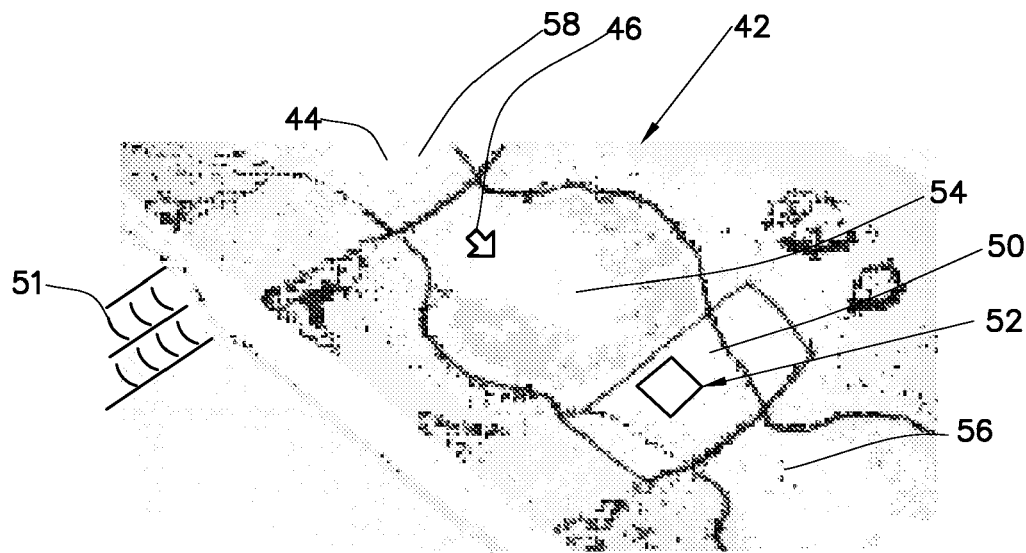
FIG. 4 is a schematic plan view of a water diversion system incorporating a hydraulic chute and a chute screen assembly having a wedge wire screen.
Figure 4A:
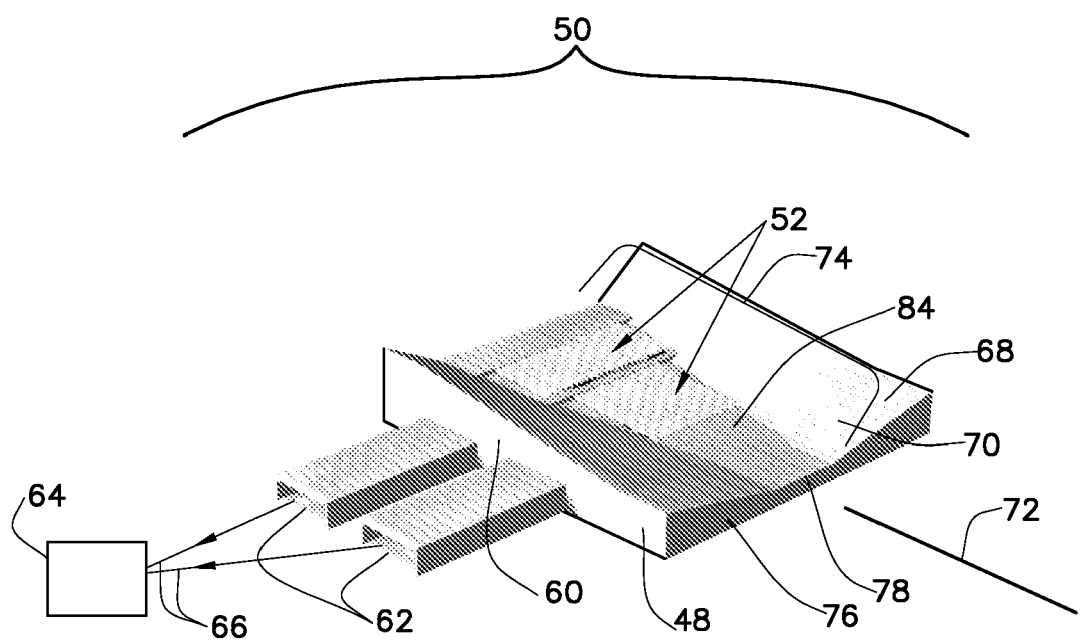
FIG. 4A is a schematic plan view of the hydraulic chute and chute screen assembly of the water diversion system of FIG. 4.

Referring to FIGS. 4 and 4A, a water diversion system 42 in a river 44 having a flow of water 46 and additional river construction 51 (FIG. 4) is illustrated. The water diversion system 42 (FIG. 4) includes a hydraulic chute 50 configured to increase the velocity of the flow of water 46 and form a hydraulic formation 108 (FIG. 5B). The water diversion system 42 (FIG. 4) also includes a chute screen assembly 52 located on the hydraulic chute 50. As shown in FIG. 4A, the hydraulic chute 50 includes a base 48 (FIG. 4A) formed of a suitable building material and constructed to form the various features of the hydraulic chute 50.

As shown in FIG. 4, the water diversion system 42 forms an upstream pool 54 and a downstream pool 56. As also shown in FIG. 4, the water diversion system 42 can also include an optional upstream chute 58 which helps to form the upstream pool 54. In addition, the upstream chute 58 can also contain a low-hazard maintenance gate or stop logs gate 138 (FIG. 7B) configured to divert the flow of water 46 for dewatering, cleaning and other maintenance activities. The water diversion system 42 can also include an optional downstream control section 80 (FIG. 5B) for further controlling the hydraulic formation 108 (FIG. 5B) formed by the hydraulic chute 50.

As shown in FIG. 4A, the water diversion system 42 also includes at least one collection chamber 60 in the base 48 subjacent to the hydraulic chute 50, and one or more diversion flow outlets 62 in flow communication with the collection chamber 60. The collection chamber 60 is configured to collect filtered diversion water which has passed through the chute screen assembly 52, and to channel a diversion water flow 66 into the diversion flow outlets 62. The collection chamber 60 can be open to the atmosphere, using suitable vents, creating a free flow condition. Alternately, the collection chamber 60 can be in a pressurized condition for further regulating the diversion water flow 66 through the diversion flow outlets 62. The diversion flow outlets 62 are configured to direct the diversion water flow 66 to a diversion location 64, such as a turbine, a water treatment facility, a waste water treatment facility, a storm water disposal system, a mining facility, an agricultural facility or a fish hatchery.

As shown in FIG. 4A, the hydraulic chute 50 includes sloped sidewalls 68, which constrict the flow of water 46 and form fish passage zones 70. The sloped sidewalls 68 can be formed by forming the base 48 of the hydraulic chute 50 in a required shape. In addition, the sloped sidewalls 68 can slope inward towards the centerline 72 of the hydraulic chute 50 (similar to the banks of a river) such that the deepest water flows along the centerline 72, and the shallowest water flows along the edges 74 of the hydraulic chute 50. The sloped sidewalls 68 can also converge towards the centerline 72 from the upstream end to the downstream end of the hydraulic chute 50. This constricts the flow of water 46 and increases its velocity. The sloped sidewalls 68 can include boulders, orifice plates or structures that create lower bank velocities and create intestinal spaces and chambers to create resting areas for fish passage zones 70. The sloped sidewalls 68 can also be configured to have flow areas lower than the screens to insure fish passage at low rates of water flow 10. The sloped sidewalls 68 can also be extended beyond the main portion of the hydraulic chute 50 to lower the slope and velocities in the fish passage zones 70.

As shown in FIG. 4A, the hydraulic chute 50 also includes a sloped bottom surface 84 where the chute screen assembly 52 is located. In addition to being on the sloped bottom surface 84, the chute screen assembly 52 can also be located along the sloped sidewalls 68 of the hydraulic chute 50. The sloped bottom surface 84 of the hydraulic chute 50 forms the ceiling for the collection chambers 60. The sloped bottom surface 84 can be formed by forming the base 48 of the hydraulic chute 50 in a required shape. The hydraulic chute 50 (FIG. 4A) also includes an abrupt drop 76 (FIG. 4A) with an adjustable lip 78 (FIG. 4A), which forces the hydraulic formation 108 (FIG. 5B) to occur downstream of the chute screen assembly 52 (FIG. 4A). The abrupt drop 76 (FIG. 4A) and the adjustable lip 78 (FIG. 4A) can be formed by separate blocks attached to the base 48 (or formed integrally with the base 48) of the hydraulic chute 50 (FIG. 4A).

Figure 5:
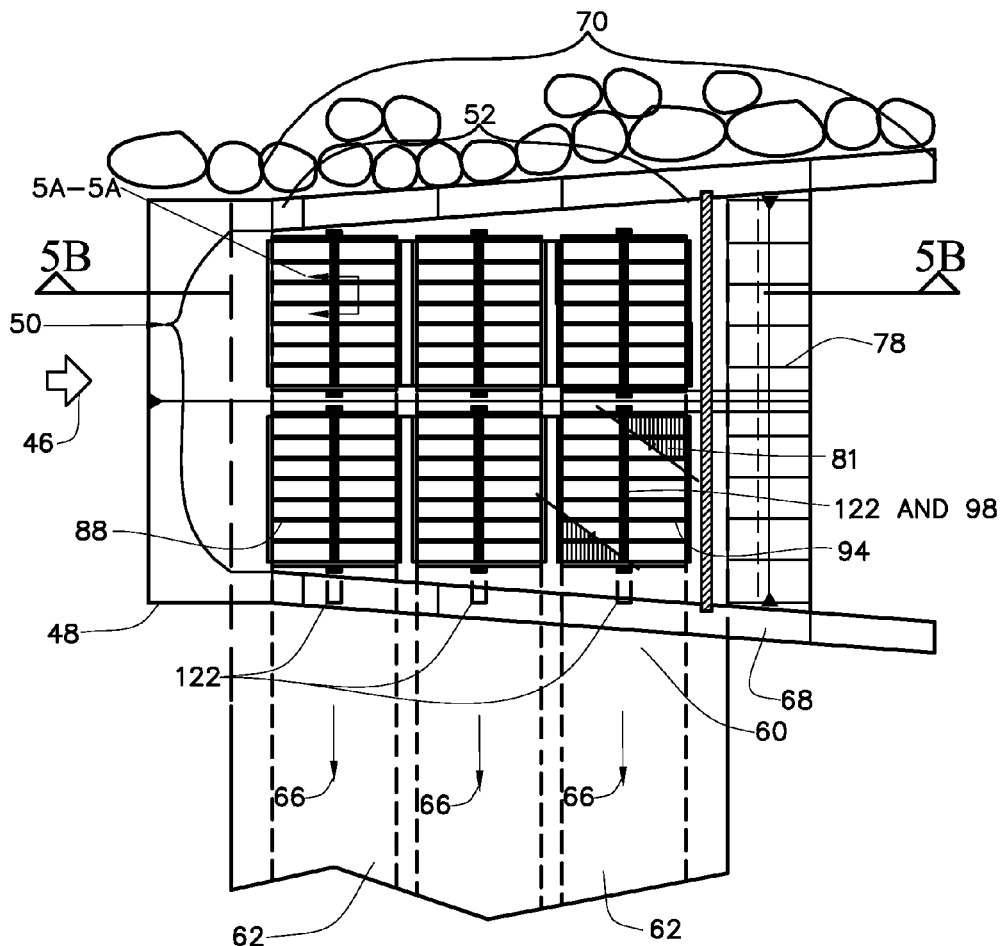
FIG. 5 is a plan view of the hydraulic chute and chute screen assembly of the water diversion system of FIG. 4.
Figure 5A:
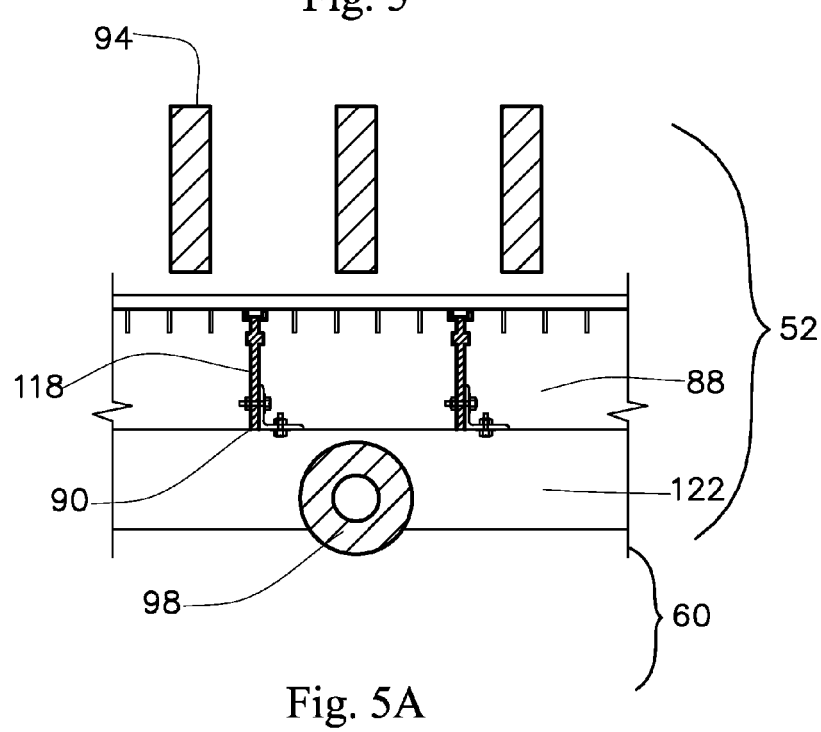
FIG. 5A is a cross sectional view taken along section line 5A-5A of FIG. 5.
Figure 5B:
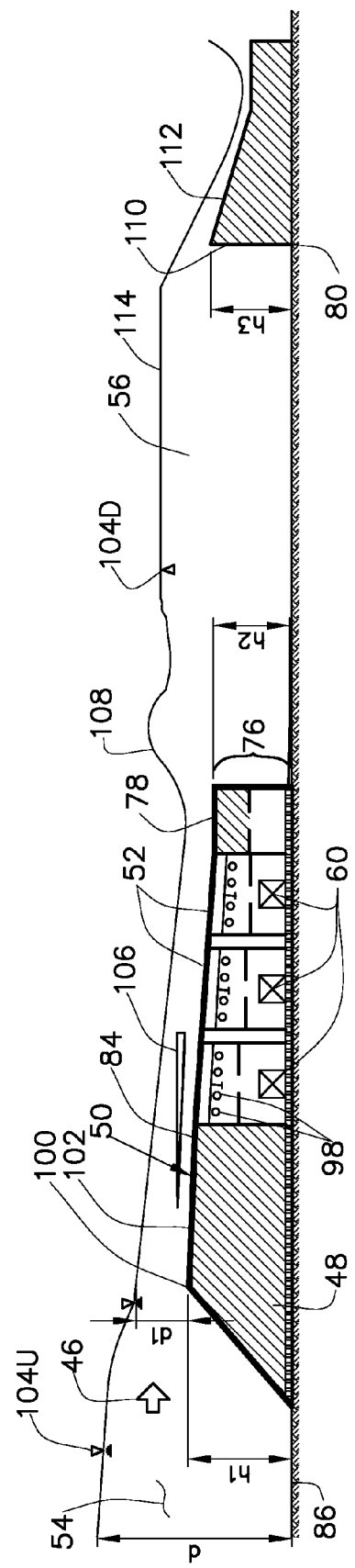
FIG. 5B is a cross sectional view taken along section line 5B-5B of FIG. 5.

Referring to FIGS. 5-5A, further details of the hydraulic chute 50 and the chute screen assembly 52 are illustrated. The chute screen assembly 52 includes a tilted wedge wire screen 81 (FIG. 5A). As will be further explained, the chute screen assembly 52 can include one tilted wedge wire screen 81 (FIG. 5A), or a plurality of separate tilted wedge wire screens 81 (FIG. 5A). Additionally, each hydraulic chute 50 can include one chute screen assembly 52, or a plurality of chute screen assemblies 52. As shown in FIG. 5A, the tilted wedge wire screen 81 attaches to a mounting frame 88, and to mounting brackets 90, which attach to intermediate parallel supports 118 and to intermediate perpendicular supports 122 attached to the base 48 (FIG. 5). In addition, an optional trash rack 94 can also be attached to the chute screen assembly 52. This optional trash rack 94 however does not continually support the wedge wire screens 81. As also shown in FIG. 5A, an air/water backwash system 98 can also be formed on the base 48 of the hydraulic chute 50. The air/water backwash system 98 can be used to force air or water against the underside of the tilted wedge wire screen 81 (FIG. 5A) for cleaning or maintenance.

Referring to FIG. 5B, further details of the hydraulic chute 50 are illustrated. The base 48 of the hydraulic chute 50 is formed on the invert 86 (bottom) of the river 44 (FIG. 4) or channel. The base 48 can comprise concrete, reinforced concrete, grouted rock, or other suitable building material that can be poured in forms configured to shape the base 48 with the required features. The base 48 of the hydraulic chute 50 includes a crest 100 and accelerator 102.

The crest 100 (FIG. 5B) and the accelerator 102 (FIG. 5B) form a control section in which the flow of water 46 is focused and increased in energy. The crest 100 is formed or placed on the invert 86 of the river 44 generally perpendicular but sloped upward relative to the flow of water 46. The crest 100 (FIG. 5B) functions similarly to a small dam, and is configured to constrict and build up the water to form a hydraulic drop. The hydraulic drop is the difference in elevation between the water surface upstream 104U and the water surface downstream 104D of the hydraulic chute 50. The height h1 of the crest 100 (FIG. 5B) will be dependent on the depth d of the water in the river 44.

The accelerator 102 (FIG. 5B) of the hydraulic chute 50 comprises a sloped structure that can be formed continuously with the crest 100 (FIG. 5B). The crest 100 (FIG. 5B) is configured to accelerate the flow of water 46 from the crest 100 downstream to the adjustable lip 78. The accelerator 102 (FIG. 5B) also varies the velocity and energy of the flow of water 22, which preferably has a supercritical flow as it contacts the adjustable lip 78. As shown in FIG. 5B, the accelerator 102 can slope downwardly from the upstream end to the downstream end of the hydraulic chute 50. As represented by the triangular segment 106 (FIG. 5B), a representative slope of the accelerator 102 can be from flat (horizontal) to 30 percent. The accelerator 102 can also have a shape which diverges the flow of water 46 towards the adjustable lip 78 such that a more focused v-shaped hydraulic formation is produced.

The chute screen assembly 52 (FIG. 5B) is located on the upper surface of the base 48, which is the bottom surface 84 of the hydraulic chute 50. In addition, the chute screen assembly 52 is located over the collection chambers 60, which can comprise hollow portions of the base 48 or separate containers placed in or on the base 48. Further details of the chute screen assembly 52 will become more apparent as the description proceeds. As also shown in FIG. 5B, the base 48 includes the air/water backwash system 98 for the collection chambers 60. The air/water backwash system 98 can comprise pipes or conduits which allow air or water to be forced against the undersides of the tilted wedge wire screens 81 (FIG. 5A) for cleaning and maintenance.

The adjustable lip 78 (FIG. 5B) and the abrupt drop 76 (FIG. 5B) are located downstream proximate to the downstream pool 56 (FIG. 5B), and can comprise portions of the base 48 (FIG. 5B) of the hydraulic chute 50 (FIG. 5B). The height h2 of the adjustable lip 78 (FIG. 5B) and the abrupt drop 76 (FIG. 5B) will be dependent on the height h1 of the crest 100 (FIG. 5B), with h2 being less than h1.

The adjustable lip 78 (FIG. 5B) and the abrupt drop 76 (FIG. 5B) can be made of a plurality of separate blocks that set into the base 48, so that it is possible to manually adjust the height h2. The adjustable lip 78 (FIG. 5B) can also comprise an adjustable flap (not shown) hinged at the upstream edge, with the downstream edge rotated up or down as required for stable and low-hazard hydraulics. A co-pending patent application entitled: "Adjustable Physical Structures For Producing Hydraulic Formations For Whitewater Recreationalists" by the inventor herein Richard Evan McLaughlin, which is incorporated herein by reference, discloses additional structures and methods for forming the adjustable lip 78.

The height h2 (FIG. 5B) of the adjustable lip 78 (FIG. 5B) can be selected to form the hydraulic formation 108 (FIG. 5B) in the downstream pool 56 with desired characteristics. For example, the hydraulic formation 108 (FIG. 5B) can comprise a wave of a selected height and shape. The hydraulic formation 108 is preferably formed downstream of the hydraulic chute 50, such that the flow of water 46 has an efficient sweeping action over the chute screen assembly 52. In addition, the hydraulic formation 108 is preferably formed to present a low hazard to recreational river users and not create a barrier to upstream fish passage.

The control section 80 (FIG. 5B) can comprise a physical structure formed on the invert 86 of the river 44 out of a suitable building material such as concrete. The control section 80 is configured to control the tailwater 114 (FIG. 5B) in the downstream pool 56, and to insure that the hydraulic formation 108 (FIG. 5B) occurs downstream of the abrupt drop 76 (FIG. 5B). The control section 80 (FIG. 5B) can include a second crest 110 having a selected height h3 which can be approximately 0.5 feet to 2 feet above the height h2 of the abrupt drop 76. In addition, the control section 80 (FIG. 5B) can include a sloped ramp 112 for accelerating the water flow 46 away from the downstream pool 56.

Figure 6A:
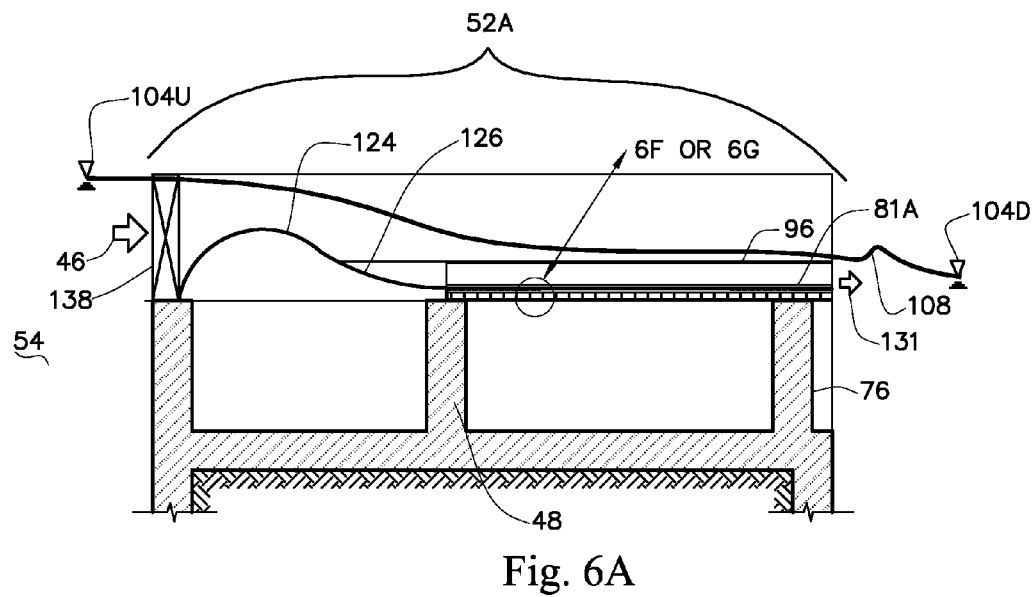
FIG. 6A is a cross sectional view of the chute screen assembly of the water diversion system of FIG. 4 taken along the water flow direction.
Figure 6B:
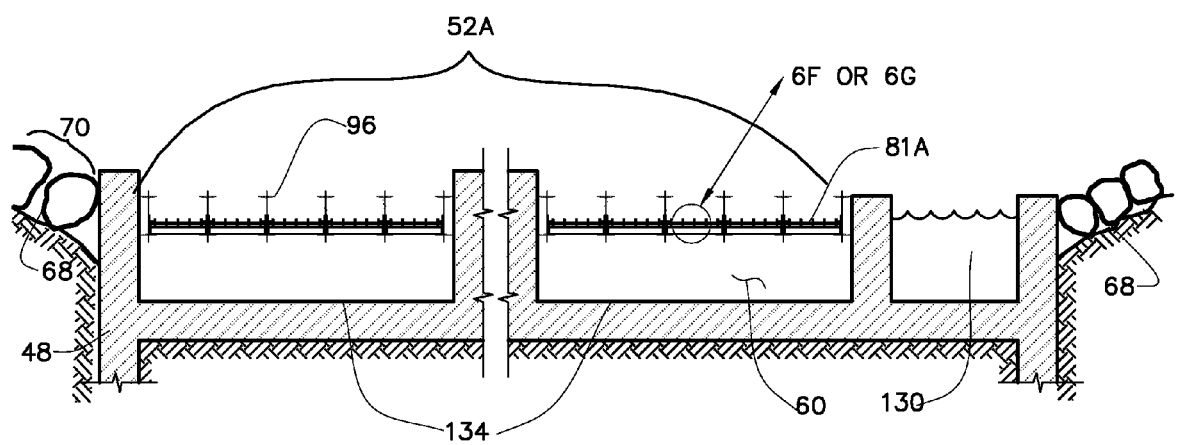
FIG. 6B is a cross sectional view of the chute screen assembly of the water diversion system of FIG. 4 taken orthogonally to the water flow direction.
Figure 6F:
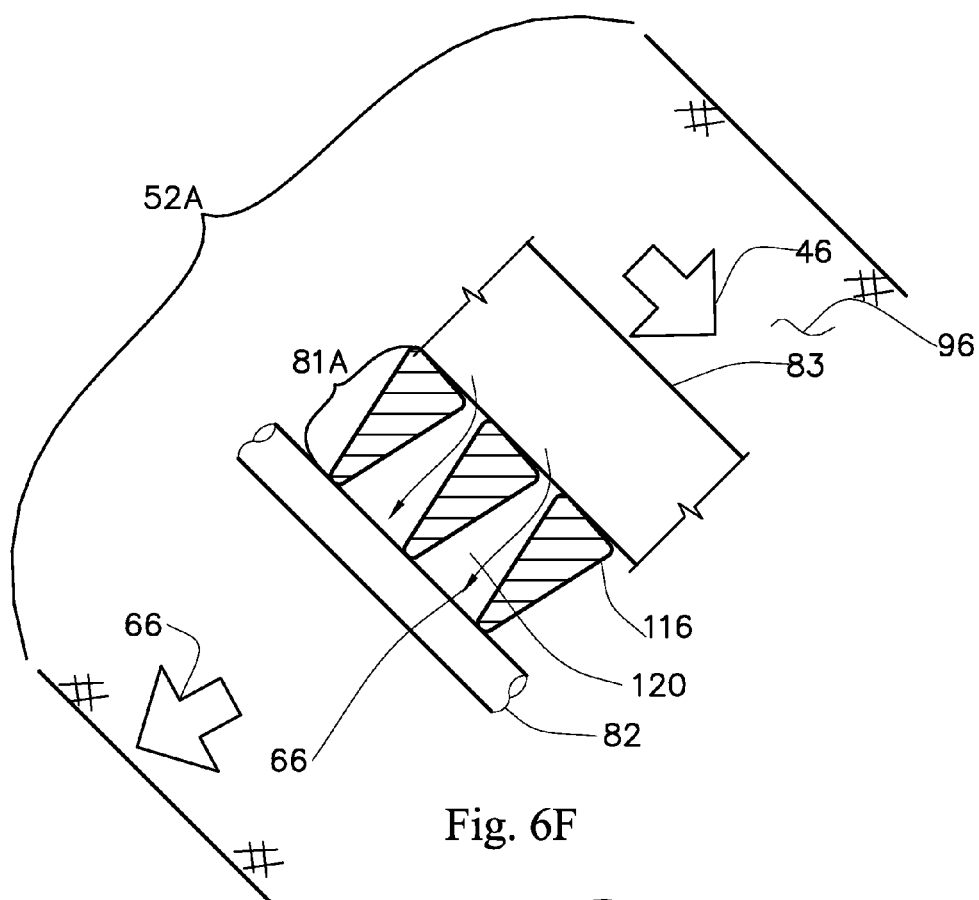
FIG. 6F is an enlarged detail view of a first embodiment protected chute screen assembly taken along line 6F of FIG. 6A.
Figure 6G:
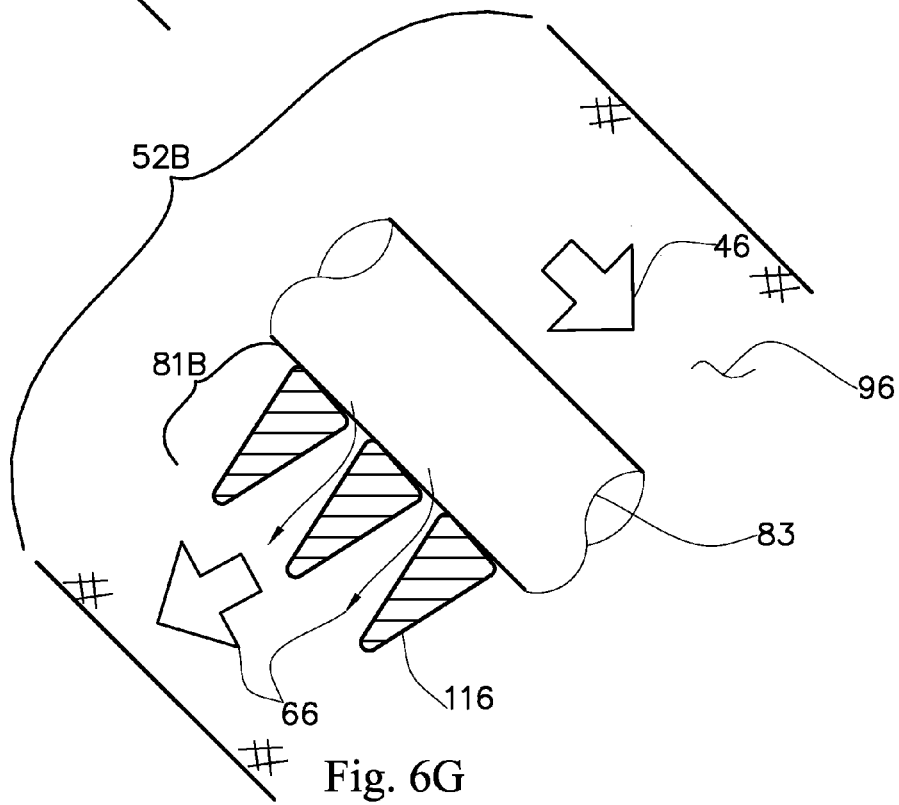
FIG. 6G is an enlarged detail view of a second embodiment protected chute screen assembly taken along line 6G of FIG. 6A.

Referring to FIGS. 6A-6G, a protected chute screen assembly 52A with a tilted wedge wire screen 81A is illustrated. As shown in FIG. 6F, the tilted wedge wire screen 81A is attached to support rods 82 (FIG. 6F) and to surface protection support bars 83 (FIG. 6F). The support rods 82 (FIG. 6F) can be round or rectangular in cross section and can be from 0.5 inches to 4 inches in diameter, and spaced from 1.5 inches to 6 inches apart. The surface protection support bars 83 can be of similar sizes and at similar spacing as the support rods 82. In FIG. 6G, a protected chute screen assembly 52B is substantially similar to the protected chute screen assembly 52A (FIG. 6F) but the support bars 82 have been eliminated.

As shown in FIG. 6A, protruding supports 96 attach to the base 48 of the hydraulic chute 50, and support the tilted wedge wire screen 81A over the collection chamber 60. In addition to supporting the tilted wedge wire screen 81A, the protruding supports 96 also protect the tilted wedge wire screen 81A. As also shown in FIG. 6A, the protected chute screen assembly 52A can also include an acceleration plate 124 oriented at approximately the same angle as the tilted wedge wire screen 81A. Alternately, the acceleration plate 124 can comprise a curved acceleration plate such as an OGREE crest, or cylindrical crest, that gets steeper until it matches the angle of the tilted wedge wire screen 81A. As another alternative, the acceleration plate 124 can have a profile that is effectively steeper than the tilted wedge wire screen 81A. The acceleration plate 124 can also include a section with a reverse curve 126 (FIG. 6A) or a curve that flattens out as the flow continues downstream.

As shown in FIG. 6B, the chute screen assembly 52A can also include a bypass channel 130 (and an associated bypass gate 128—FIG. 7A) located upstream or under the acceleration plate 124. Flow through the bypass channel 130 is conveyed under the chute screen assembly 52A and collection chamber 60 (FIG. 5B) to the downstream pool 56 (FIG. 5B). The bypass channel 130 allows for the passage of water and sediment during certain periods of operation or during maintenance activities. The chute screen assembly 52A can also be arranged in multiple screen channels 134 so that water flow 10 can be routed down only some of the multiple screen channels 134 to provide maintenance and reduce wear of the wedge wire screens 81A. The multiple screen channels can have maintenance gates or stop log gates 138 (FIG. 7B) located upstream of the wedge wire screens 81A to facilitate the routing of flows down the various multiple screen channels 138.

As shown in FIG. 6F, the tilted wedge wire screen 81A includes wedge wires 116 that are spaced to form openings 120 for the diversion flow 66 through tilted wedge wire screen 81A. As also shown in FIG. 6F, the flow of water 46 is directed by the hydraulic chute 50 along the tilted wedge wire screen 81A producing a sweeping flow 131 (FIG. 6A). The diverted water flow 66 (FIG. 6F) flows through the tilted wedge wire screen 81A generally orthogonally to the sweeping flow 131 (FIG. 6A) along the tilted wedge wire screen 81A. The diverted water flow 66 has been filtered by the tilted wedge wire screen 81A to remove debris and fish. The debris and fish remain in the flow of water 46 and proceed downstream.

Flow diverted through the tilted wedge wire screen 81A (FIG. 6F) is made up by two types of flow: Shearing Flow and Orifice Flow.

Shearing Flow—The tilted wedge wires 116 (FIG. 6F) are oriented horizontally across and generally perpendicular to the water flow 46. Each wedge wire 116 (FIG. 6F) is tilted downstream a few degrees. The leading (upstream) edge of the tilted wire 116 (FIG. 6F) protrudes into the flow of water 46 and shears off a thin slice into the slot opening in front of it.

Orifice Flow—Water flowing through an openings 120 (FIG. 6F) due to a pressure differential is Orifice Flow. With the tilted wedge wire screen 81A (FIG. 6F) the openings 120 can also be called orifices or screen slot openings. The depth of water and the directional flow (vector) determines the pressure on the orifices. The size of the openings 120 (FIG. 6F) determines the resistance to water flowing through. When water is still (zero velocity) the entire screen flow is Orifice Flow.

As shown in FIGS. 6C-6E, the tilted wedge wire screen 81A and the support bars 82 can also be mounted to modular panels 85 (FIG. 6C). Each modular panel 85 includes a modular frame 123 (FIG. 6E) which attach to the protruding supports 96 (FIG. 6D) using modular frame attachments 121 (FIG. 6D), and intermediate perpendicular supports 142. The chute screen assembly 52A can be designed so that the modular panels 85 can be dropped in from above, or so that the modular panels 85 can be installed by sliding them into place from the downstream or upstream ends of the protruding supports 96 (FIG. 6D). The nominal widths of the modular panels 85 and spacing of the protruding supports 96 can typically range from 1-foot to three feet depending upon the nature of the river or channel 12 and so that they can be easily handled. This relatively narrow width also allows the protruding support plates 96 (FIG. 6D) to protect the tilted wedge wire screens 81. The length of the modular panels 85 can range from several feet to 10 feet. Rather than employing the tilted wedge wire screen 81A, this construction can be utilized with perforated plates or non-tilted wedge wire screen.

The modular panels 85 (FIG. 6C) also provide other advantages.

Minimal supporting material is wasted when the tilted wedge wire screen 81A is replaced (e.g., in about every 2-10 years).

If a modular panel 85 (FIG. 6C) is damaged it can easily be replaced.

Spare modular panels 85 (FIG. 6C) can be held on hand at the site, and standards can be in inventory at the factory for quick shipment Different titled wedge wire screen 81A can be tested to minimize maintenance and the amount of sediments diverted to the system 42 including different slot openings 120 (FIG. 6F) typically from 0.25 mm to 8 mm and different anti-fouling coatings to reduce accumulation of algae or mussels.

The reverse curve acceleration plate 124 (FIG. 6A) provides the following advantages.

Shortens the overall length of the titled wedge wire screen 81A (FIG. 6A) meaning less cost.

Allows for more uniform depth and velocities across the titled wedge wire screen 81A (FIG. 6A) therefore reducing localized areas or higher velocities and flow through the titled wedge wire screen 81A. "Hot spots" can cause sequential plugging, (e.g., one area of the titled wedge wire screen 81A has a lot of flow through, gets plugged and then a new area forms, get plugged, etc., until the entire titled wedge wire screen 81A is plugged).

Allows the titled wedge wire screen 81A (FIG. 6A) to be placed at a flatter slope which reduces that mount of total hydraulic drop need, reducing floodplain impacts, costs, environmental impacts, etc.

Referring to FIGS. 7, 7A and 7B, an alternate embodiment sluice channel chute screen assembly 52C is illustrated. The sluice channel chute screen assembly 52C includes a bypass gate 128 and an integrated sluice channel 140 for a sluice flow 129. The bypass gate 128 can comprise a slide gate, a sluice gate, a radial gate, a rubber tube-type dam, stop logs gate, or a hinge gate.

The integrated sluice channel 140 (FIG. 7) provides the following advantages.

Allows one unit to be supplied and "dropped" into place.

Simplifies design and construction, and can speed up installation

Reduces constructions costs

Reduces maintenance by maintaining a pool directly upstream of the hydraulic chute 50 thereby minimizing sediments and debris passed over the screen.

Referring to FIGS. 6A and 7B, an alternate embodiment maintenance gate or stop logs gate 138 is illustrated (in cross section only). The maintenance gate or stop logs gate 138 is included in the hydraulic chute 50 at some location upstream of the tilted wedge wire screens 81A. The bypass gate 129 can comprise a slide gate, a sluice gate, a radial gate, a rubber tube-type dam, stop logs gate or a hinge gate. The maintenance gate or stop logs gate 138 is configured to divert the flow of water 46 away from the wedge wire screens 81 for dewatering, cleaning and other maintenance activities.

As shown in FIG. 7B, the sluice channel chute screen assembly 52C can also include a flow depth increaser 132 having a triangular, or other cross-sectional shape, which can be inserted in the downstream channel flow. The flow depth increaser 132 (FIG. 7B) can be inserted or removed with simple attachments such as bolts, clips, or pins. The flow depth increaser 132 (FIG. 7B) allows the operator to increase the depth of water over the titled wedge wire screen 81A. The flow depth increaser 132 (FIG. 7B) can be from 2 inches to several feet high, and allows the operator to adjust for seasonal conditions such as winter to prevent ice formation or during fall to reduce leaf or algae accumulation.

The flow depth increaser 132 provides the following advantages.

Reduces plugging during low flow periods.

Allows for adjustments to be made to account for varying condition in the river such as during periods of high leaf or algae content in the river.

The sluice channel chute screen assembly 52C also includes multiple screen channels 134 formed over the titled wedge wire screen 81A. The screen channels 134 provide the following advantages.

Facilitates maintenance

Reduces unnecessary screen wear during low diversion periods

Provides reliability

Dimensions and sizes of the various components of the water diversion system 42 (FIG. 4) shown and described above can vary depending upon the application including river and diversion flow rates, site conditions, etc.

River 44 (or Channel) Constriction. One effect of the hydraulic chute 50 (FIG. 4) is to constrict the river 44 (FIG. 4) or channel to focus flows over the chute screens 52 (FIG. 4). The appropriate constriction depends upon the proposed site, anticipated river flow range, the desired minimum flow depth in the hydraulic chute 50 (FIG. 4), and the hydraulic requirements for forcing the resulting hydraulic jump downstream of the chute screen assembly 52 (FIG. 4). Constrictions of the river or channel 44 can be supplemented with an additional river constrictions 51 adjacent to or as a part of the hydraulic chute 50. Chute invert widths of 10 to 30 feet were considered. For a river 44 (FIG. 4) with an invert width of 150 feet, this translates to a constriction in the river invert from 80 to 93 percent.

Downstream Control Section 80 (FIG. 5B). The effective invert (i.e., h3—FIG. 5B) of the downstream control section 80 (FIG. 5B) can be set at 0.5 feet above to 2 feet below the elevation of the adjustable lip 78 (FIG. 5B) of the hydraulic chute 50 (FIG. 5B). The cross-section of the control section 80 is designed to create a tailwater 114 (FIG. 5B) curve to cause the hydraulic formation 108 (FIG. 5B) to occur downstream of the abrupt drop 76 (FIG. 5B). Flow in the vicinity of the crest 110 (FIG. 5B) of the downstream control section 80 (FIG. 5B) is in a hydraulic state referred to as critical depth. Critical depth is obtained over a wide range of flows thereby controlling the tailwater 114 (FIG. 5B) and the formation and location of the hydraulic formation 108 (FIG. 5B) below the abrupt drop 76 (FIG. 5B) and the chute screen 52 (FIG. 5B).

Depth Of Flow d1 (FIG. 5B). Because of the constrictive nature of the hydraulic chute 50 (FIG. 5B), the normal depth d1 (FIG. 5B) of flow over the chute screen assembly 52 (FIG. 5B) is relatively deep compared to conventional COANDA screen. Depths during normal flows over the screen assembly 52 (FIG. 5B) in the hydraulic chute 50 (FIG. 5B) can vary between several inches and five feet, however the chute screen assembly 52 (FIG. 5B) is effective at diverting flow at depths of a fraction of an inch.

Screen Opening 120 (FIG. 6F). Screen opening 120 (FIG. 6F) widths tested included ¼, ½ and 1 mm. Larger openings can be up to several inches, depending upon material to be screened. Tilt angles of the tilted wedge wire screens 81 (FIG. 5A) were 5%, but with the collection chambers 60 (FIG. 5B) operated in a pressurized condition, steeper angles (due to reduced cavitation and air entrainment) may be beneficial and offer higher capacity.

Hydraulic Chute 50 (FIG. 5B) Slope. The slope of the hydraulic chute 50 (FIG. 5B) can vary from flat to 30 percent. Tested slopes were in the range of 14 percent. Flat or flatter tilted wedge wire screens 81 (FIG. 5A) would rely on the upstream constriction, accelerator 102 (FIG. 5B), and down stream drop at the abrupt drop 76 (FIG. 5B) to accelerate flows. The accelerator 102 (FIG. 5B) can also have slopes within the flat to 30 degree range. Steeper slopes could require more collection chambers 60 (FIG. 5B) and create potential safety hazards. The abrupt drop 76 (FIG. 5B) can be vertical or sloped at a 1:4 (1 vertical to 4 horizontal) (25%) slope.

Because of its design and construction, the water diversion system 42 (FIG. 4) has a number of advantages over a conventional diversion. Some of these advantages are as follows.

Low Hazard To River Users. A conventional diversion employs a dam. Dams have been demonstrated to be hazardous to river users at various flows and hydraulic conditions. The tilted wedge wire screen 81 (FIG. 5A) relies upon the hydraulic chute 50 (FIG. 5B) which lowers hazardous conditions creates currents conductive to recreational use. Also conventional diversions usually have gates, trash racks, cleaning equipment and other apparatus needed to keep hydraulic conditions suitable in response to conditions created by screens and trash racks located in an upper diversion pool.

Conductive To Fish Passage. Dams create obstructions to fish passage. The hydraulic chute 50 (FIG. 5B) can be readily configured to promote upstream passage of fish over a wide range of river conditions and flows. Sloped sidewalls 68 can include boulders, orifice plates, or structures that create lower bank velocities and create intestinal spaces and chambers to create resting areas for fish passage zones 70.

Fish Friendly Tilted Wedge Wire Screens 81 (FIG. 5A). Because of the beneficial hydraulic conditions created by the hydraulic chute 50 (FIG. 5B) and the tilted wedge wire screens 81 (FIG. 5A), all screening can be completed within the river 44 (FIG. 4) or channel. This eliminates the need for screens located away from the channel and the resulting need to return flow back from the screen to the river 44 (FIG. 4) or channel. This "return flow" entails costs, requires maintenance, and is disadvantageous for fish (fisheries biologists prefer "on stream" screens rather than off-channel screens). Most conventional diversions have off-channel screens when fish screen is required.

Better Screening And Less Maintenance. With the hydraulic chute 50 (FIG. 5B) acting to increase sweeping velocities across the chute screen assembly 52 (FIG. 5B), smaller openings 120 (FIG. 6F) can be used to keep out smaller debris, particles and fish. Also, the tilted wedge wire screens 81 (FIG. 5A) tend to stay cleaner and do not require as much maintenance to clean than if located within an upstream pool where sweeping velocities are much lower.

Less In-River Mechanical Apparatus. The water diversion system 42 (FIG. 4) does not rely upon an upstream pool, as does a conventional diversion. Therefore, apparatus such as sluice gates, channels, etc. are not needed to maintain pool depth.

Better Applicability To Submerged Conditions. The impact upon water diversion system 42 (FIG. 4) is less than that of a conventional diversion in applications where very high flood flows can inundate the entire diversion site. Sluice and other gate operators will not need to be located in the conveyance areas of the river and screening structures are already designed to be under the water surface.

Fewer Impacts To The Floodplain and River/Channel. The chute screen assembly 52 (FIG. 5B) can be designed with a lower profile and a lower upstream crest elevation than with conventional water diversions. This is due to the fact that the chute screen assembly 52 (FIG. 5B) do not rely upon an upstream pool and the resulting high crested dam to help maintain the pool. It is also in part due to the fact that the hydraulic chute 50 (FIG. 5B) creates momentum in the channel flow and pushes the hydraulic formation 108 (FIG. 5B) and tailwater 114 (FIG. 5B) downstream—off of the chute screen assembly 52 (FIG. 5B). This allows the chute screen assembly 52 (FIG. 5B) to not raise the upstream water surface elevation and worsen flooding.

Resistant To Frazzle Ice Formation. Screens in a conventional diversion are placed close to the cold air and in slow moving water, where frazzle ice is likely to form. In the water diversion system 42 (FIG. 4), the chute screen assembly 52 (FIG. 5B) is placed at or near the warmer invert and velocities over the tilted wedge wire screens 81 (FIG. 5A) are higher. Frazzle ice (small dispersed pieces) or floating ice is less likely to form or clog a tilted wedge wire screens 81 (FIG. 5A).

Compared to a conventional COANDA Screen, which employs a steep drop the tilted wedge wire screens 81 (FIG. 5A) have a number of advantages. Some of these advantages are as follows.

Reduced River Hazards. Similar to a typical dam, a steep COANDA screen can be hazardous to recreational river users, and obstructs the upstream passage of fish. A tilted wedge wire screens 81 (FIG. 5A) placed at a lower angle to the horizontal does not create this conditions (if properly designed).

Conducive To Fish Passage. Similar to typical dams COANDA Screens obstruct the passage of fish. The hydraulic chute-50 (FIG. 5B) is more conducive to the upstream passage of fish over a wide range of river conditions and flows.

Fish Friendly Screening. It is difficult to control flow through the conventional COANDA screen diversion. This often results in a portion of the screen becoming dry and harming or killing fish. This dry screen situation has been averted through the implementation of upstream gates or weirs. However, such devices are complex, potentially hazardous, and problematic. Also fish are harmed and de-scaled due to abrasion caused by very shallow and fast flow over a conventional COANDA screen. Screen drying is avoided by the chute screen assembly 52 (FIG. 5B). The implementation of a flatter tilted-wedge wire screen allows the diverted flow to be back-watered or controlled downstream and thereby controls the diversion rate and eliminates screen drying. Also the flow in the channel over the chute screen assembly 52 (FIG. 5B) is deeper and slower than the flow in a conventional COANDA screen diversion, thereby reducing or eliminating damage to fish.

Operable Over A Wider Range Of River Or Channel Conditions. Backwater or tailwater effects can move the hydraulic jump upstream onto the screen. Such a condition decreases the useable screen area, slows the sweep velocities, and creates hazardous conditions for fish. A properly designed chute screen assembly 52 (FIG. 5B) "pushes" the tailwater 114 (FIG. 5B) and resulting hydraulic formation 108 (FIG. 5B) downstream of the chute screen assembly 52 (FIG. 5B) over a wide range of flows, and is impacted to a lesser degree by high channel flows or tailwater conditions.

Resistant To Frazzle Ice Formation. Conventional COANDA screen diversions place the screen closer to cold air which is conductive to frazzle ice formation. In the water diversion 42 (FIG. 4), the chute screen assembly 52 (FIG. 5B) is placed at a greater depth in the flow. Frazzle ice is less likely to form on the tilted wedge wire screens 81 (FIG. 5A).

The described water diversion system and components thereof have undergone extensive experimentation and testing. Experimentation included hydraulic Froude scale modeling.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A water diversion system in a river or a channel containing a flow of water comprising:
   a hydraulic chute configured to increase a velocity of the flow of water and to form a downstream hydraulic formation;
   at least one tilted wedge wire screen located in the hydraulic chute submerged in the flow of water, the screen comprising a plurality of tilted wedge wires spaced to form a plurality of openings, the tilted wedge wires configured to produce a sweeping water flow across the screen and a diverted water flow through the openings; and
   at least one collection chamber in the hydraulic chute configured to collect the diverted water flow.

2. The water diversion system of claim 1 further comprising an abrupt drop and an adjustable lip on a downstream end of the hydraulic chute configured to form the hydraulic formation.

3. The water diversion system of claim 1 wherein the hydraulic chute includes sloped sidewalls on either side of the screen configured to constrict the flow of water and form fish passage zones through the hydraulic chute.

4. The water diversion system of claim 1 wherein the screen is mounted over the collection chamber on support bars oriented generally parallel to the flow of water and configured to support and protect the screen.

5. The water diversion system of claim 1 wherein the screen is attached directly to support bars located on an exposed face of the screen configured to support and protect the screen.

6. The water diversion system of claim 1 wherein the hydraulic chute comprises:
   a crest configured to back up the flow of water;
   a sloped accelerator configured to accelerate the flow of water; and
   an abrupt drop having an adjustable lip configured to form the hydraulic formation downstream of the screen.

7. The water diversion system of claim 1 further comprising a control section downstream of the hydraulic chute configured to form a downstream pool wherein the hydraulic formation forms.

8. The water diversion system of claim 1 wherein the hydraulic chute further comprises an air/water back wash system configured to clean the screen from a backside thereof.

9. A water diversion system in a river or a channel containing a flow of water comprising:
   a hydraulic chute having a slope of from flat to 30 percent configured to increase a velocity of the flow of water and to form a downstream hydraulic formation; and
   a tilted wedge wire screen in the hydraulic chute submerged in the flow of water, the screen comprising a plurality of tilted wedge wires spaced to form a plurality of openings, the tilted wedge wires configured to provide a sweeping water flow across the screen and a diverted water flow through the openings;
   the hydraulic chute comprising sloped sidewalls on either side of the screen configured to constrict the flow of water and form fish passage zones.

10. The water diversion system of claim 9 wherein the sloped sidewalls include boulders, orifice plates or structures that create lower bank velocities and create intestinal spaces and chambers in the fish passage zones.

11. The water diversion system of claim 9 wherein the sloped sidewalls are configured to have flow areas in the fish passage zones lower than the sweeping flow.

12. The water diversion system of claim 9 wherein the screen is mounted to a modular panel attached to supporting plates attached to the hydraulic chute oriented parallel to the flow of water.

13. The water diversion system of claim 9 further comprising an integrated sluice channel configured to receive the diverted water flow.

14. A water diversion system in a river or channel containing a flow of water comprising:
   a hydraulic chute comprising a base, a crest, an accelerator, converging sloped sidewalls, a collection chamber, an abrupt drop and an adjustable lip configured to form a hydraulic formation downstream of the hydraulic chute;
   a chute screen assembly on the base including at least one screen comprising a plurality of wedge wires with openings therebetween mounted such that the flow of water through the hydraulic chute sweeps across the wedge wires and a diverted flow of water flows through the openings into the collection chamber, the chute screen assembly comprising a plurality of protruding plates configured to support and protect the wedge wires; and
   an accelerator plate on the chute screen assembly configured to accelerate the flow of water sweeping across the wedge wires.

15. The water diversion system of claim 14 further comprising a plurality of support rods attached to the wedge wires configured to support the wedge wires.

16. The water diversion system of claim 14 wherein the screen comprises a tilted wedge wire screen.

17. A water diversion system in a river or channel containing a flow of water comprising:
   a hydraulic chute comprising a base, a crest, an accelerator, converging sloped sidewalls, a collection chamber, an abrupt drop and an adjustable lip configured to form a hydraulic formation downstream of the hydraulic chute;
   a chute screen assembly on the base including at least one screen comprising a plurality of wedge wires with openings therebetween mounted such that the flow of water through the hydraulic chute sweeps across the wedge wires and a diverted flow of water flows through the openings into the collection chamber, the chute screen assembly comprising a plurality of protruding plates configured to support and protect the wedge wires; and
   a flow depth increaser on the chute screen assembly configured to increase a depth of the flow of water sweeping across the wedge wires.

18. The water diversion system of claim 17 further comprising a sluice channel and a bypass gate configured to direct the diverted flow of water to a diversion location.

19. The water diversion system of claim 17 wherein the hydraulic chute further comprises an air/water back wash system configured to clean the chute screen from a backside thereof.

20. A water diversion system in a river or channel containing a flow of water comprising:
   a hydraulic chute comprising a crest configured to back up the flow of water and form an upstream pool, an accelerator configured to accelerate the flow of water, sloped sidewalls configured to converge the flow of water and form fish passage zones, and an abrupt drop downstream of the accelerator having an adjustable lip configured to form a hydraulic formation downstream of the hydraulic chute;

a chute screen assembly mounted to the hydraulic chute between the accelerator and the abrupt drop comprising at least one tilted wedge wire screen attached to support bars; and a collection chamber below the chute screen assembly configured to collect a diverted water flow through the screen.

21. The water diversion system of claim 20 wherein the hydraulic chute comprises a base and the adjustable lip comprises a plurality of blocks or a hinged member on the base.

22. The water diversion system of claim 20 wherein the chute screen assembly comprises a modular panel.

23. A method for diverting a flow of water in a river or a channel comprising:

providing a hydraulic chute in the flow of water configured to increase a velocity of the flow of water and to form a downstream hydraulic formation;

providing a tilted wedge wire screen in the hydraulic chute submerged in the flow of water, the screen comprising a plurality of titled wedge wires spaced to form a plurality of openings, the wedge wires configured to produce a sweeping water flow across the screen and a diverted water flow through the openings;

providing a collection chamber configured to collect the diverted water flow;

directing the flow of water in the hydraulic chute across the screen to form the sweeping water flow and downstream to form the hydraulic formation; and directing the diverted water flow through the screen into the collection chamber.

24. The method of claim 23 further comprising providing fish passage zones in the hydraulic chute on either side of the chute screen.

25. The method of claim 23 further comprising providing an adjustable lip and an abrupt drop on the hydraulic chute configured to form the hydraulic formation.

* * * * *